US010339139B2

(12) United States Patent
Gehrke et al.

(10) Patent No.: US 10,339,139 B2
(45) Date of Patent: Jul. 2, 2019

(54) COMPUTER SYSTEM AND METHODS FOR PERFORMING DATA-DRIVEN COORDINATION

(75) Inventors: Johannes Gehrke, Bellevue, WA (US); Christoph Koch, Ecublens (CH); Lucja Kot, Freeville, NY (US); Nitin Gupta, San Mateo, CA (US)

(73) Assignee: Cornell University, Ithaca, NY (US)

( * ) Notice: Subject to any disclaimer, the term of this patent is extended or adjusted under 35 U.S.C. 154(b) by 1166 days.

(21) Appl. No.: 13/816,382

(22) PCT Filed: Aug. 15, 2011

(86) PCT No.: PCT/US2011/047779
§ 371 (c)(1),
(2), (4) Date: Jan. 21, 2014

(87) PCT Pub. No.: WO2012/024232
PCT Pub. Date: Feb. 23, 2012

(65) Prior Publication Data
US 2014/0304302 A1 Oct. 9, 2014

Related U.S. Application Data

(60) Provisional application No. 61/374,115, filed on Aug. 16, 2010.

(51) Int. Cl.
*G06F 7/00* (2006.01)
*G06F 16/2455* (2019.01)
*G06F 16/242* (2019.01)
*G06F 17/30* (2006.01)

(52) U.S. Cl.
CPC .... *G06F 16/24554* (2019.01); *G06F 16/2425* (2019.01)

(58) Field of Classification Search
CPC ......... G06F 17/30445; G06F 17/30598; G06F 16/24554; G06F 16/2425
USPC ........ 707/764, 609, 610, 634, 737, 999.002, 707/999.003, 999.004, E17.032
See application file for complete search history.

(56) References Cited

U.S. PATENT DOCUMENTS

| | | | |
|---|---|---|---|
| 6,338,055 B1 * | 1/2002 | Hagmann | ......... G06F 17/30448 |
| 6,732,088 B1 | 5/2004 | Glance | |
| 2002/0128897 A1 | 9/2002 | Nelson et al. | |
| 2003/0033279 A1 | 2/2003 | Gibson et al. | |
| 2007/0198615 A1 | 8/2007 | Krishnamurthy et al. | |

OTHER PUBLICATIONS

Kot et al. "Beyond Isolation: Research Opportunities in Declarative Data-Driven Coordination.", SIGMOD Record, vol. 39, No. 1, published Mar. 2010, http://www.sigmod.org/publications/sigmod-record/1003/p27.article.kot.pdf.

* cited by examiner

*Primary Examiner* — Boris Gorney
*Assistant Examiner* — Christy Y Kim
(74) *Attorney, Agent, or Firm* — Valauskas Corder LLC

(57) ABSTRACT

A computer system and computer implemented method that obtains coordinated results from at least two queries by utilizing context data of each query. Specifically, the computer system and computer implemented method facilitates enhanced querying functionality by matching entangled queries to achieve coordinated results.

15 Claims, 8 Drawing Sheets

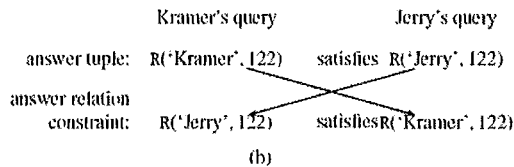

|   Flights    |      |   Airlines   |           |
|--------------|------|--------------|-----------|
| fno          | dest | fno          | airlines  |
| 122          | Paris| 122          | United    |
| 123          | Paris| 123          | United    |
| 134          | Paris| 134          | Lufthansa |
| 136          | Rome | 136          | Alitalia  |

(a)

Kramer's query           Jerry's query answer tuple:    R('Kramer', 122)   satisfies  R('Jerry', 122)

answer relation
constraint:       R('Jerry', 122)    satisfies R('Kramer', 122)

{R(Jerry,$x$)} R(Kramer,$x$) :− F($x$,Paris)
{R(Kramer,$y$)} R(Jerry,$y$) :− F($y$,Paris) ∧ A($y$,United)
(a)

1:    {R(Jerry, 122)}    R(Kramer, 122)
    2:    {R(Jerry, 123)}    R(Kramer, 123)
    3:    {R(Jerry, 134)}    R(Kramer, 134)
    4:    {R(Kramer, 122)}   R(Jerry, 122)
    5:    {R(Kramer, 123)}   R(Jerry, 123)
(b)

FIG. 3

{R(Jerry,$x$)} R(Kramer,$x$) :− F($x$,Paris)
{R(Jerry,$y$)} R(Elaine,$y$) :− F($y$,Athens)
    {R($f$,$z$)} R(Jerry,$z$) :− F($z$,$w$) ∧ Friend(Jerry,$f$)
(a)

{R(Jerry,$x$)} R(Kramer,$x$) :− F($x$,Paris)
{R(Kramer,$y$)} R(Jerry,$y$) :− F($y$,Paris)
  {R(Jerry,$z$)} R(Frank,$z$) :− F($z$,Paris) ∧ A($y$,United)
(b)

FIG. 4

COMPUTER SYSTEM AND METHODS FOR PERFORMING DATA-DRIVEN COORDINATION

The present application claims priority to U.S. Provisional Patent Application No. 61/374,115 filed Aug. 16, 2010, the disclosure of which is hereby incorporated by reference in its entirety.

STATEMENT CONCERNING FEDERALLY SPONSORED RESEARCH

This invention was made with U.S. government support, National Science Foundation Nos. 0534404 and 0911036. The U.S. government may have certain rights in the invention.

FIELD OF THE INVENTION

The invention relates generally to computer systems comprising data sources such as databases, computer files, and data streams accessed to return certain results to a user. More specifically, the invention relates to a computer system comprising an application that facilitates enhanced querying functionality by matching entangled queries to achieve coordinated results.

BACKGROUND OF THE INVENTION

Collaboration and coordination are increasingly important aspects of the way users produce, process, and consume data. Such collaboration and coordination occurs in a variety of applications such as scientific database management and online internet user activities, for example, organizing and coordination travel plans for multiple users.

Computer programs such as software applications commonly utilize relational databases for processing and storing data. For example, a software application for making airline flight reservations may query relational databases of multiple airlines. A user of the software application may enter desired criteria, such as the date of the flight and the destination, into the software application, and the software application may then query the airline databases to present one or more flight options to the user. The user may, in turn, select one of the options to make a reservation using the software application.

Often times, the user may utilize the software application to coordinate activities of multiple users. For example, both the user and a colleague may wish to travel on the same flight. Typically, this is accomplished by the user and the colleague having to communicate with each other regarding certain information such as convenient flight dates, times, and seat preferences, before the user may enter the criteria into a user interface such that the software application can complete the transaction—either on behalf of himself or on behalf of himself and the colleague. In the event the user books the tickets for himself and the colleague, further communications must occur to sort out the finances. In the event the user and the colleague book the tickets individually, they must arrange to book at about the same time and hope that the desired airline seats do not become reserved. Reserving time for such communications, however, may be inconvenient for the user and the colleague.

Other scenarios present similar problems. For example, there are many other settings in which users may wish to coordinate activities including schedules. College students may want to enroll in the same courses as their friends, busy professionals may desire to schedule joint meetings, wedding guests may desire to purchase gifts in a way that avoids duplication, event planners may desire to gather family members from various locations for a family reunion, etc. Coordination also occurs in massively multiplayer online ("MMO") games, where players are often interested in developing joint strategies with other players to achieve common objectives.

Despite the plethora of scenarios such as those described above, coordination is not commonly supported by today's computer and software applications. This may partly be due to the fact that the cornerstone of the database community relies on what is known as the ACID properties: Atomicity, Consistency, Isolation, Durability. The ACID properties guarantee logical operations—i.e., database transactions—are processed reliably. Atomicity requires that database modifications must follow an "all or nothing" rule. Each transaction is said to be atomic. If one part of the transaction fails, the entire transaction fails and the database state is left unchanged. Consistency states that only valid data will be written to the database. If, for some reason, a transaction is executed that violates the database's consistency rules, the entire transaction could be rolled back to the pre-transactional state or it is restored to a consistent state. Isolation refers to the requirement that multiple transactions occurring at the same time not impact each other's execution. Each transaction must remain unaware of other concurrently executing transactions, except that one transaction may be forced to wait for the completion of another transaction that has modified data that the waiting transaction requires. Durability ensures that any transaction committed to the database will not be lost. In order to reliably process transactions, ACID supports the use of isolated transactions and isolated transactions create an obstacle to coordinating queries to obtain a result desirable by one or more users.

The technical problem according to the invention relates to the inability to obtain coordinated results from at least two queries. The solution to the technical problem includes the design and development of a computer implemented method that utilizes context data of each query to obtain results coordinated between the queries, i.e., "coordinated results". Therefore, the invention provides a computer implemented method that facilitates enhanced querying functionality by matching entangled queries to achieve coordinated results.

SUMMARY OF THE INVENTION

The coordination problem has long been avoided, probably as a consequence of accepting isolation among transactions as a dogma. However, data-driven coordination has real uses. Process-centric abstractions are not a good fit for data-driven applications. A large class of data-driven applications is easier and faster to develop using a data-centric abstraction such as entangled queries. Moreover, a well-engineered high-level abstraction like entangled queries advantageously creates an opportunity for automatically optimizing coordination on a large scale that is not possible for the lower-level abstractions offered by conventional systems.

Conventional systems—such as nested transactions, Sagas, or Con Tract—weaken isolation such that coordination is difficult. According to the invention, bidirectional or multi-directional flow is utilized to achieve coordination. Furthermore, the invention provides automated matchmaking between queries, which is a problem not addressed at all in conventional systems. Trigger conditions of conventional systems are preconditions, while the coordination constraints of entangled queries of the present invention are post-conditions on the desired state of the database after coordination. The invention addresses and solves the problems presented by triggers in that they provide no straightforward way to achieve coordination matchmaking.

The combination of a declarative query language such as SQL with coordination constraints according to the invention captures the general Constraint Satisfaction Problem ("CSP"), which is NP-complete. The invention allows for a coordination solution to be a choice (non-deterministic) from a query result, constrained by cross-query conditions. Additionally, the present invention entails a combinatorial satisfiability problem.

There are in fact two sources of non-determinism or disjunction and thus complexity in the coordination problem. The first source is the choice of queries to be grouped together. The second source is the choice of data tuples from the query results that are chosen as coordinating solutions. Elimination of the second type of complexity may not occur. This is the same issue that causes select-projection queries to be NP-complete if the query is considered to be part of the input. On the other hand, this is usually considered acceptable because queries are small. If this second source of NP-completeness had to be eliminated, declarative queries with coordination constraints in a similar formalism could not be supported.

One feature of the invention is a syntactic condition referred to as safety, which ensures that coordination may be performed efficiently in the sense that the first source of complexity is eliminated. Safe queries are designed to allow efficient evaluation in realistic settings rather than express generic CSP instances.

Coordination is only NP-hard in the size of the groups of queries or individuals who want to coordinate. For example, in a travel scenario where an arbitrary number of pairs of two people want to coordinate, this size is two. The hardness result is independent of the total number of entangled queries in the system, and also of the size of the data in the data source.

The algorithm according to the invention merges queries to be coordinated into standard SQL queries that only produce coordinated solution tuples for the constituent entangled queries. Accordingly, the essential query matching/coordination problem is solved without access to the data. Entangled queries are expressed in an extension of SQL, allowing the coordination constraints and the data involved in the coordination to be specified at the same level of abstraction.

An algorithm for coordination is provided that begins by operating at the syntactic level to solve the query matching problem, namely identifying the potential coordination partners for each query. Next, each set of matching queries is combined into a larger query that expresses the desired joint outcome. Finally, the answers to the combined query are used to generate individual answers.

The system supports coordination in two modes: set-at-a-time mode (queries arrive in batches) and incremental mode (queries arrive as a stream). The properties of coordination structures to partition and evaluate query sets independently and in parallel are leveraged to obtain final results.

The invention is directed to a computer program such as a software application that includes the algorithm for performing data-driven coordination. "Data-driven coordination" is based on the synchronization of the data itself. For example, instead of relying on direct data such as details of a particular task (otherwise referred to herein as "transaction") as selected by the user, the invention facilitates the consideration of context data such as the time the user completed the task.

Furthermore, the invention considers data related to each query whether the queries are entered simultaneously or consecutively. For example, a first user enters a first query and defines data that relates to a second query that has not yet been entered by a second user. The invention considers the second query once it is entered by the second user. Specifically, the invention considers data of the second query which is submitted at any point in time after the first query.

The computer method for performing data-driven coordination includes at least two queries—each query is submitted such as through a user interface by a user and includes one or more constraints. Constraints include direct data and context data (collectively referred to herein as "data"). Direct data is information related to a particular task as defined by the user whereas context data is information related to a particular task resultant from completion of the task—i.e., selecting a submit button. For example, direct data may be the constraint that two users desiring to travel together wish to depart on a Friday and book with a particular flight carrier. Context data may be the constraint that one user booked his flight using a certain Internet Protocol address on a particular date and at a particular time.

Based on the transactions of users, one or more constraints are automatically matched to determine a coordination structure. More specifically, the constraints are coordinated by automatically matching the data between queries to obtain "coordinated constraints". Therefore, the term "entangled queries" is two or more queries that include matching data. The constraints may be coordinated based on context data, or context data and direct data in combination. A coordination structure is determined that includes the coordinated constraints. The coordination structure is used to construct a set of combined queries. All or part of the set of combined queries is forwarded to a data source for evaluation. It is contemplated that queries entered subsequent to an initial query may be forwarded to the data source to be considered in the evaluation.

The data sources analyze the data in order to ultimately return results. For purposes of this application, the term "data source" comprises at least one database, computer file, and data stream. It is contemplated that the data sources may be located locally or remotely such as on a server that is accessible through a network such as a cloud-computing network.

Specifically, the combined queries are evaluated for one or more candidate answers to the entangled queries. Each candidate answer corresponds with one or more result answers to the entangled queries. The result answers are returned to the users. Specifically, the result answers satisfy the coordination constraints of the at least two entangled queries.

According to the invention, data is collaborated and coordinated. Specifically, user entered data forms a set of entangled queries. For the purposes of this application, "entangled queries" refers to computer language or code that extends Structured Query Language ("SQL") by constraints that allow for the coordinated choice of result tuples across queries originating from different users or applications.

The invention allows users to collaborate and coordinate activities and tasks entered as data into a front end of the computer system application, such as a web application. It is contemplated that a user may be a person, group of people, entity, institution, company, etc. According to the invention, data received from users is collaborated and coordinated to provide one or more results. The results may then be selected by the users to achieve a common goal, for example having a group of users book a common airline flight.

Many data-driven social and Web applications involve collaboration and coordination. The data-driven coordination of the invention supports coordination in data management. The invention makes data management data-centric and specifies data using convenient declarative language. The invention employs entangled queries, which extends Structured Query Language ("SQL") by constraints that allow for the coordinated choice of result tuples across queries originating from different users or applications.

The invention further provides an efficiently enforceable syntactic safety condition that incorporates interesting declarative power and applicability in large scale data management systems and applications.

The Structured Query Language ("SQL") invention includes an algorithm that matches entangled queries to achieve coordination. The algorithm analyzes query workloads and merges coordinating entangled queries into compound SQL queries. The entangled queries may be sent to a data source and return only coordinated results after evaluation.

The invention provides a way for users to coordinate within the system and without concern about the details of the coordination. Because the coordination is data-driven, the coordination abstraction is designed to sit at the same level as other abstractions that relate to the data.

According to one embodiment of the invention, users may express what is to be achieved, rather than how it is to be achieved. In a declarative specification of coordination, the users' only responsibility is to state their individual preferences and constraints, and the invention takes care of the remaining processes to provide answers based on the input individual preferences and constraints.

The described embodiments are to be considered in all respects only as illustrative and not restrictive, and the scope of the invention is not limited to the foregoing description. Those of skill in the art will recognize changes, substitutions and other modifications that will nonetheless come within the scope of the invention and range of the claims.

DESCRIPTION OF THE DRAWINGS

The preferred embodiments of the invention will be described in conjunction with the appended drawing provided to illustrate and not to the limit the invention, where like designations denote like elements, and in which:

FIG. 2 illustrates a data source and a mutual constraint satisfaction according to one embodiment of the invention;

FIG. 3 illustrates an intermediate representation of queries and a set of grounded queries according to one embodiment of the invention;

FIG. 4 illustrates an unsafe set of queries and a set of queries which is not unique according to one embodiment of the invention;

DETAILED DESCRIPTION OF THE PREFERRED EMBODIMENT

Although a number of embodiments of the invention will be described in the following, it is understood that these embodiments are presented by way of example only, not limitation. The detailed description of the exemplary embodiments of the invention should not be construed to limit the scope or breadth of the invention.

The technical problem according to the invention relates to the inability to obtain coordinated results from at least two queries. The solution to the technical problem according to the invention includes a computer program such as a software application that facilitates enhanced querying functionality by matching entangled queries including context data of each query to achieve coordinated results.

Figure 1:
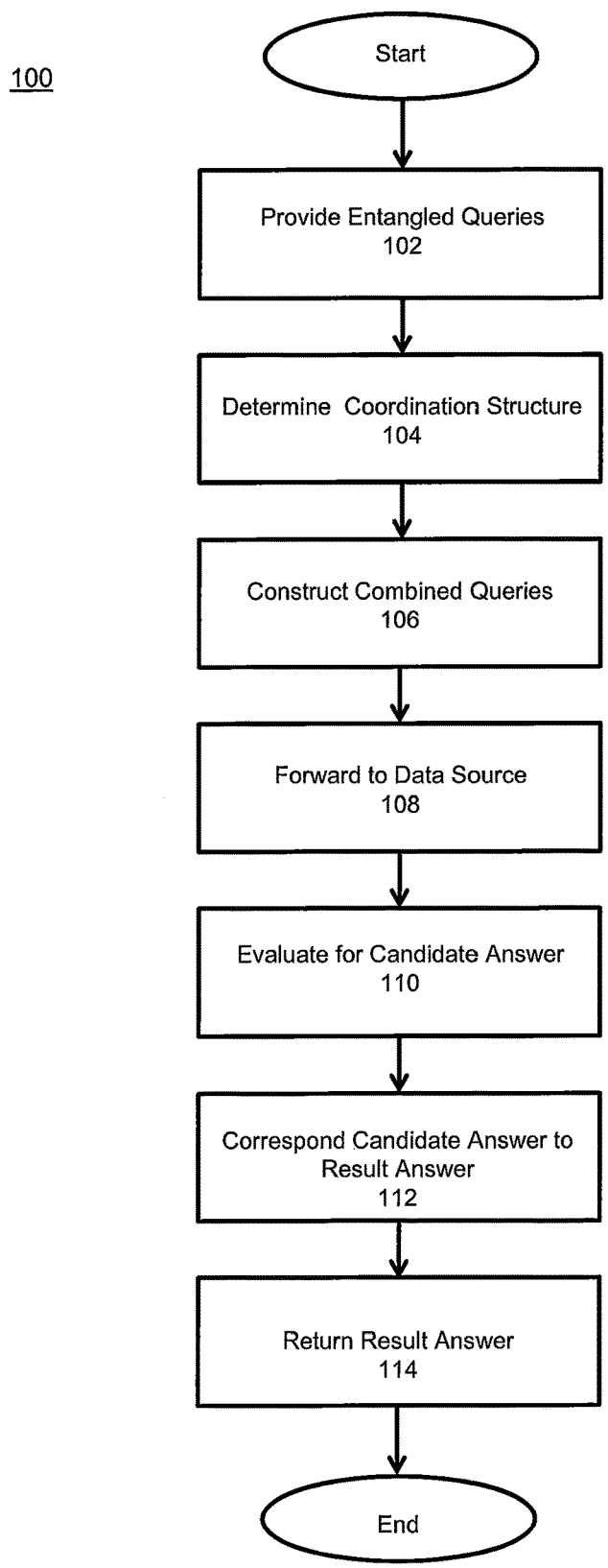
FIG. 1 illustrates a flowchart of a method for performing data-driven coordination according to one embodiment of the invention.

One embodiment of a computer method for performing data-driven coordination is shown generally as 100 in FIG. 1. The method 100 starts by providing at least two entangled queries at step 102. Each of the entangled queries may include one or more coordination constraints. Coordination constraints are usually specified by users, and may be any number of constraints. An exemplary constraint for two users desiring to travel together may be a particular selection of the airline for the flight. Another constraint imposed by the users may be a date range for when the flight may occur.

The computer method 100 includes a step of determining a coordination structure based on automatically matching the one or more coordination constraints of the at least two entangled queries at step 104. Generally, once information is provided in step 102, the following steps of the method 100 occur automatically without any user interaction. The method 100 also has steps of constructing a set of combined queries based on the coordination structure at step 106, and forwarding the set of combined queries to a data source such as a database at step 108.

The method 100 further evaluates each combined query of the set of combined queries for one or more candidate answers of the at least two entangled queries at step 110. At step 112, each candidate answer of the one or more candidate answers corresponds with each entangled query to obtain one or more result answers. After obtaining the one or more result answers at step 112, one or more result answers are returned at step 114. The one or more result answers satisfy the coordination constraints of the at least two entangled queries. Users may then select one of the result answers to achieve the desired task expressed in terms of the provided entangled queries.

According to the invention, SQL-like syntax for entangled queries is introduced, an intermediate representation is proposed, and the semantics of query answering is defined.

In one embodiment, an entangled query may be expressed in extended SQL using the following syntax:

```
SELECT select_expr
INTO ANSWER tbl_name [, ANSWER tbl_name] ...
[WHERE where_answer_condition]
CHOOSE 1
```

The WHERE clause is a normal condition clause that may refer to both data source tables and ANSWER tables. The ANSWER tables are not normal data source relations, whether permanent or temporary. Their purpose in the query is to serve as names that are shared among queries and permit coordination.

As an example, suppose a first user—referred to herein as "Kramer"—wants to travel to Paris on the same flight as a second user—referred to herein as "Jerry". Kramer's transaction is expressed as:

```
SELECT 'Kramer', fno INTO ANSWER Reservation
WHERE
fno IN (SELECT fno FROM Flights WHERE dest='Paris'
AND ('Jerry', fno) IN ANSWER Reservation
CHOOSE 1
```

Jerry also wishes to travel with Kramer, but has an additional constraint—he wants to travel only on flights that are operated by a specific carrier, for example, United Airlines. Therefore, Jerry's transaction is expressed as:

```
SELECT 'Jerry', fno INTO ANSWER Reservation
WHERE
fno IN (SELECT fno FROM Flights F, Airlines A WHERE
  F.dest='Paris' and F.fno = A.fno
  AND A.airline = 'United')
AND ('Kramer', fno) IN ANSWER Reservation
CHOOSE 1
```

In these queries, "Reservation" is a name for a virtual relation that contains the answers to all the current queries in the system. The SELECT clause specifies Kramer's own expected answer, or, in other words, his contribution to the answer relation "Reservation". This contribution, however, is conditional on two requirements, which are given in the WHERE clause. First, the flight number in question must correspond to a flight to Paris. Second, the answer relation must also contain a tuple with the same flight number, but Jerry as the traveler name. Jerry's query places a near symmetric constraint on "Reservation".

In the above example, neither user explicitly specifies which other queries he wishes to coordinate with—e.g., by using an identifier for the coordination partner's query. Instead, the coordination partner is designated implicitly using the partner's query result. This is a deliberate choice that allows coordination with potentially unknown partners based purely on desired shared outcomes. In travel planning, of course, it typically is known who one's coordination partners will be. However, the invention is applicable in other scenarios such as MMO games where coordination partners may be unknown and their identities irrelevant.

When the system receives Kramer and Jerry's queries, the system answers both of the queries in a way that ensures a coordinated flight number choice. In general, there may be many different suitable flights, but Kramer and Jerry only want to make a booking on one of the flights. The CHOOSE 1 clause which is present in both queries specifies that only one tuple is to be returned per query. The tuples returned must be such that all constraints are satisfied.

If the data source is a flight data source as shown in FIG. 2(a), the system non-deterministically chooses either flight 122 or flight 123 and returns appropriate answer tuples. FIG. 2(b) shows the mutual constraint satisfaction that takes place in answering for flight 122. The desired outcome is that Kramer and Jerry should now be able to make a booking on flight 122.

Although the above queries are simplified to illustrate the basic coordination mechanics, it is contemplated that those skilled in the art understand that the queries may include additional constraints such as checks for seat availability as well as any other factor.

In the example above, the relation "Reservation" is an ANSWER relation. There is no relation named "Reservation" in the data source. After the queries are evaluated, Kramer and Jerry each receive a result set with the appropriate answer tuple. These answer tuples do not persist anywhere, nor are they accessible to any other queries. In particular, Kramer's answer tuples are not even accessible to Jerry's query and vice versa. The CHOOSE 1 at the end of the query explicitly specifies that the system should choose exactly one tuple among all the tuples which satisfy the coordination constraints, and that such a query should be chosen at random.

The invention comprises semantics and an evaluation algorithm for entangled queries that are restricted to use only select-project-join (conjunctive) queries on the ANSWER relations in the WHERE clause, and otherwise arbitrary queries. Such queries are powerful and expressive enough to handle many real-world coordination scenarios.

Although entangled queries are specified in an extension of SQL, their evaluation is easier to perform on an intermediate representation. The intermediate representation uses a Data log-like syntax; however, it does not involve any recursion and it is completely equivalent to the SQL syntax presented above.

In this representation, an entangled query has the form $$\{C\}H{:}{-}B$$

where C and H are conjunctions of relational atoms over answer relations and B a query over data source (non-answer) relations. B, H and C represent body, head and post-condition of the query, respectively. Each atom in the representation may contain constants and variables. All variables that appear in H or C must also appear in B, which is a range-restriction requirement. For simplicity of discussion, B is restricted to conjunctions of relational atoms for simplicity in understanding the invention. This is, however, not required in general.

For an entangled query expressed in extended SQL, H corresponds to the SELECT INTO clause, while B and C correspond to information in the WHERE clause. C specifies all the conditions on answer relations from the WHERE clause. B specifies the conditions on data source relations from the WHERE clause, as well as serving to bind variables used in H and C.

FIG. 3(a) shows the intermediate representation of Kramer and Jerry's queries. The relations "Reservation", "Flights" and "Airlines" are abbreviated as R, F and A respectively.

From the point of view of a single entangled query, evaluation is a process that returns an answer, i.e., a single row from the appropriate answer relation. Evaluation always involves a set of entangled queries, and the goal is to populate the answer relation in a way that respects all queries' coordination constraints. In the running example, Kramer and Jerry wish to coordinate on flight numbers. The system evaluates their queries by finding a tuple for Kramer's query and a tuple for Jerry's query that share the same flight number, and returning each tuple as an answer to the appropriate query.

Consequently, coordination semantics must be defined from the perspective of the system, by specifying how a set of entangled queries must be answered together. The process which the system must perform is termed herein as "coordinated query answering" as described more fully below. For correctness, it is desirable to ensure that the underlying data source is not changed during the answering process.

Coordinated query answering makes use of two technical concepts—valuations and groundings. If q is a query in the intermediate representation and the current data source is D, a valuation is an assignment of a value from D to each variable of q. For example, on the data source in FIG. 2(a), Kramer's query has three valuations: x may be mapped to either 122, 123, or 134. Every valuation of a query is associated with a grounding, which is q itself with the variables replaced by constants following the valuation. In this application the terms "grounding" and "grounded query" are used interchangeably herein.

The set of queries to be evaluated in a coordinated manner is represented by Q. In the description that follows, use of $\mathcal{G}$, which is the set of groundings of the queries on the data source, is made. Evaluation does not require that $\mathcal{G}$ be materialized. However, for the purpose of explaining the semantics, $\mathcal{G}$ is a useful tool.

FIG. 3(b) shows the set $\mathcal{G}$ obtained by grounding Kramer and Jerry's queries on the data source in FIG. 2(a). The bodies of the groundings are no longer needed and may be discarded.

To find the answers, the evaluation is a search for a subset $\mathcal{G}' \subseteq \mathcal{G}$ such that $\mathcal{G}'$ contains at most one grounding of each query and the groundings in $\mathcal{G}'$ may all mutually satisfy each other's post-conditions. That is, if all the heads of the groundings in $\mathcal{G}'$ a were combined into a set, this set would contain all the post-conditions. Any set of groundings satisfying this property is referred to as a coordinating set. Once such a $\mathcal{G}'$ is found, the evaluation produces an answer relation which consists of the union of all the head atoms in $\mathcal{G}'$. The answer may consist of more than one relation. This may happen if the head atoms refer to more than one relation, i.e., the original queries mention more than one ANSWER relation.

FIG. 3(b) illustrates the initial set $\mathcal{G}$. Groundings 1 and 4, as well as groundings 2 and 5, are suitable coordinating subsets $\mathcal{G}'$. Either of the groundings may be used to generate the answer relation and return answers to the respective queries.

It is possible that the selected $\mathcal{G}'$ might not contain any groundings for some queries. This event may be thought of as a statement that those queries could not be answered. Various solutions exist for handling this case in the transaction code.

To obtain guarantees on answering, multiple suitable coordinating sets $\mathcal{G}'$ may exist. With respect to what requirements should be placed on evaluation, it is clearly desirable that some $\mathcal{G}'$ be found unless none exists, and perhaps also that the $\mathcal{G}'$ chosen be maximal, i.e., contain groundings of as many queries as possible. However, the following theorem exposes fundamental limitations on the guarantees that may be provided efficiently.

Given a set of queries Q and an instance of the data source D, it is NP-complete to determine whether there exists a coordinating set $\mathcal{G}' \subseteq \mathcal{G}$, where $\mathcal{G}$ is the set of all groundings for Q on D, containing at most one grounding of each query from Q. This result is not surprising considering that entangled queries are powerful enough to encode instances of a CSP.

The main reason for the complexity of entangled query evaluation is not actually the choice of the data values, such as specific flight numbers or hotel rooms. The complexity is due to the fact that for arbitrary sets of queries, a backtracking search is required to discover the coordination structure; that is, the way the queries and their respective groundings match up together. Moreover, sometimes this coordination structure is not unique.

Fortunately, real-world users are very unlikely to generate sets of entangled queries that encode complex constraint satisfaction. In fact, the sets of queries that real-world users usually generate are likely to have a very specific structure. This knowledge is exploited in developing an efficient evaluation algorithm that allows tractable evaluation with respect to the complexity of the data.

In most practical scenarios, the coordination structure that users express through entangled queries has two formal properties: safe and unique. First, the notion of safe coordination is considered. In the example involving Kramer and Jerry, each query has a clear coordination partner. This means there is one clear desired global outcome: both Jerry and Kramer receive the details of a United Airlines flight to Paris. Suppose, however, that the data source is extended in the flight booking scenario with a "Friend" relation, and that three users—Kramer, Jerry and Elaine—are mutual friends.

As illustrated in FIG. 4(a), an unsafe set of queries is provided. The queries represent the fact that Kramer wants to coordinate with Jerry on a flight to Paris, Elaine wants to coordinate with Jerry on a flight to Athens, and Jerry is happy to coordinate with any friend on any flight.

This set of queries does not fully specify the structure of the desired coordination. Jerry's query has two potential queries in the set that could be its coordination partners. However, his query requires a single tuple as an answer. There are two possible coordination outcomes that satisfy some users: either Jerry flies with Kramer or he flies with Elaine. However, there is no outcome that satisfies all users, and it is unclear how the system might choose between the two outcomes above.

To understand what it means for a coordination structure to be unique, the three queries shown in FIG. 4(b) are considered. Here Jerry and Kramer wish to coordinate on a flight to Paris. Additionally, Frank wishes to coordinate with Jerry on a flight to Paris, but only if the airline selected is United Airlines. Depending on the flight data source, there are several possibilities for coordination here. First, it may be possible to book all three users on a United Airlines flight. Of course, it is possible that no suitable United Airlines flights exist. In this case, Jerry and Kramer may still be able to coordinate and fly with another airline. The coordination structure here is safe—each query has a unique coordination partner—but it is not unique. There are proper subsets of the entire set of queries that may be able to coordinate "locally" even if the entire set may not.

More specifically, a safe set of queries may be characterized in terms of logical unifiability between various head and post-condition atoms of the queries in the set. Two relational atoms are considered that contain constants and variables involving the same relation. They are unifiable unless they contain different constants for the same attribute value. For example, R(x, y) and R(z,z) are unifiable whereas R(2, y) and R(3, z) are not. A set of queries Q is called unsafe if it contains a query q with a post-condition atom that is unifiable with two or more head atoms found in Q. These may be either head atoms of two different queries, or two head atoms of the same query. Evaluation of such queries is intractable and leads to degradation in the performance of the computer system.

For example, in FIG. 4(a), Jerry's query has a post-condition atom R(f,z) which unifies with the head of Kramer's query as well as the head of Elaine's query. Therefore, the set of queries is unsafe.

If presented with a set of queries which is unsafe, the system has several options. Ideally, the problem would be pointed out to the users involved and they would receive feedback allowing them to reformulate their queries. Alternately, the computer system may remove queries from the set until the remaining set was safe such as by iterating over the query set and searching for queries q with post-conditions that unify with more than one head atom. All such queries q would be removed from the set when found. This procedure is simple and may be performed efficiently. More sophisticated strategies known to those skilled in the art for query removal may be appropriate in particular application settings.

A set of queries is safe if it involves the exclusion of queries whose post-conditions unify with more than one head. Uniqueness of the coordination structure, on the other hand, has to do with heads that unify with more than one post-condition, as seen in the set of non-unique queries in FIG. 4(b). The head atom of the second query, R(Jerry, y) unifies with the post-condition atoms of both the first and third query. However, the restriction required for Uniqueness of Coordination Structure ("UCS") is not as straight forward as excluding all queries with such heads. Sometimes these types of configurations may be permitted. Intuitively, the problem is due to the fact that a subset of the queries may coordinate separately of the rest of the queries.

To define the UCS property for a set of queries, a simplified version of the unifiability graph may be used (described more fully below). A graph is constructed with a node for every query in the system. An edge is drawn from node $q_i$ to $q_j$ if a head atom of $q_i$ unifies with a post-condition atom of $q_j$. Intuitively, if there is a path from query $q_k$ to $q_l$, this means that groundings of query $q_l$ require groundings of $q_k$ for satisfaction, directly or transitively.

The graph may be used to define UCS. A set of queries has the UCS property if every node in its simplified unifiability graph belongs to a strongly connected component of the same graph. This excludes the type of behavior shown in FIG. 4(b) in which the set of queries in not unique. The simplified unifiability graph for this set of queries has three nodes, one for each query. There are three edges—edges in both directions between Jerry and Kramer's queries, and an additional edge from Jerry's query to Frank's query. Thus, Frank's query does not belong to a strongly connected component of the graph.

An interesting property is that a set of queries could satisfy the UCS property even though a query in the set is unsafe. For example, the third query shown in FIG. 4(a) is part of the strongly connected component of the graph, although it is unsafe.

In settings where the coordination structure is both safe and unique, efficient evaluation is possible. If a set of entangled queries Q is safe and UCS, then all the queries may be evaluated in PTIME with respect to data complexity.

The intuition for why efficient evaluation is possible is that the coordination structure may be discovered efficiently. If a graph is constructed based on the unifiability of the head and post-condition atoms of the query, the strongly connected components of the unifiability graph correspond to sets of queries that are coordination partners and require each other's post-conditions during evaluation.

Within each such group, the specific way in which the queries match is unique. It is therefore possible to collect the queries together into a big query that specifies a single joint outcome based on the way they match. As an example, Jerry and Kramer's queries may be combined into this post-condition-free query:

$$R(\text{Kramer},x) \wedge R(\text{Jerry},x) :- F(x,\text{Paris}) \wedge (x,\text{United})$$

This query specifies that the system should find a United Airlines flight to Paris and return the two answer tuples to Jerry and Kramer.

In the evaluation process as outlined above, safety guarantees tractability, by ensuring that there is a unique way to combine the queries in each strongly connected component into a bigger query. The UCS property guarantees correctness—it is known that any possible answers will not be missed (i.e., coordinating sets of groundings) that involve proper subsets of a set of matching queries.

The algorithm for coordinated query answering is implemented in computer software. The algorithm is invoked either automatically at regular intervals or through explicit requests. Upon invocation, the algorithm operates on a snapshot of the data source and on a fixed set Q of queries. The set Q is assumed to be safe. If necessary, a simple check may be run on Q to ensure safety.

The algorithm according to the invention has two main phases: query matching and evaluation proper. Query matching discovers the coordination structure implicit in the individual entangled queries and uses this structure to construct a set of combined queries. Once each combined query is available, it is sent to the data source for evaluation. Each answer to this query referred to as "candidate answer" corresponds to a "result answer", which may include a set of answers to the individual entangled queries. The first or any other combined query answer may be used to produce the individual answers.

Query matching discovers the coordination structure implicit in the set of entangled queries. In most cases, as discussed, users submit small groups of queries that match only each other. That is, the structure consists of a potentially large number of small, disconnected groups of queries that will coordinate only internally.

The query matching phase discovers this structure in two steps. First, the query matching phase identifies the disconnected, independent groups of queries. In doing so, the query matching phase partitions Q into a set of components which may subsequently be processed independently and in parallel. Next, the algorithm works on each group of queries to discover the actual coordination by determining how the query heads and post-conditions match.

All stages of this process make use of a data structure called the unifiability graph that represents certain dependencies among the queries in Q with respect to matching. The unifiability graph of a set of queries Q is a multi-digraph or directed multi-graph that contains a distinct node $N(q_i)$ for each query $q_i$ in Q. There is an edge from query node $N(q_i)$ to query node $N(q_j)$ for each pair of atoms (h, p) such that h is a head atom of $q_i$, p is a post-condition atom of $q_j$, and h unifies with p. In the follow description, $q_i$ is used to represent both a query in Q and the corresponding node in the unifiability graph. For every query $q_i$ in Q, INDEGREE($q_i$) denotes the in degree of the corresponding graph node, and PCCOUNT($q_i$) equals the number of post-conditions of query $q_i$. Safety guarantees that there will be at most one edge into a graph node $q_i$ for each post-condition of $q_i$. This means that for every query $q_i$ in Q, INDEGREE($q_i$)≤PCCOUNT($q_i$)

Figure 5:
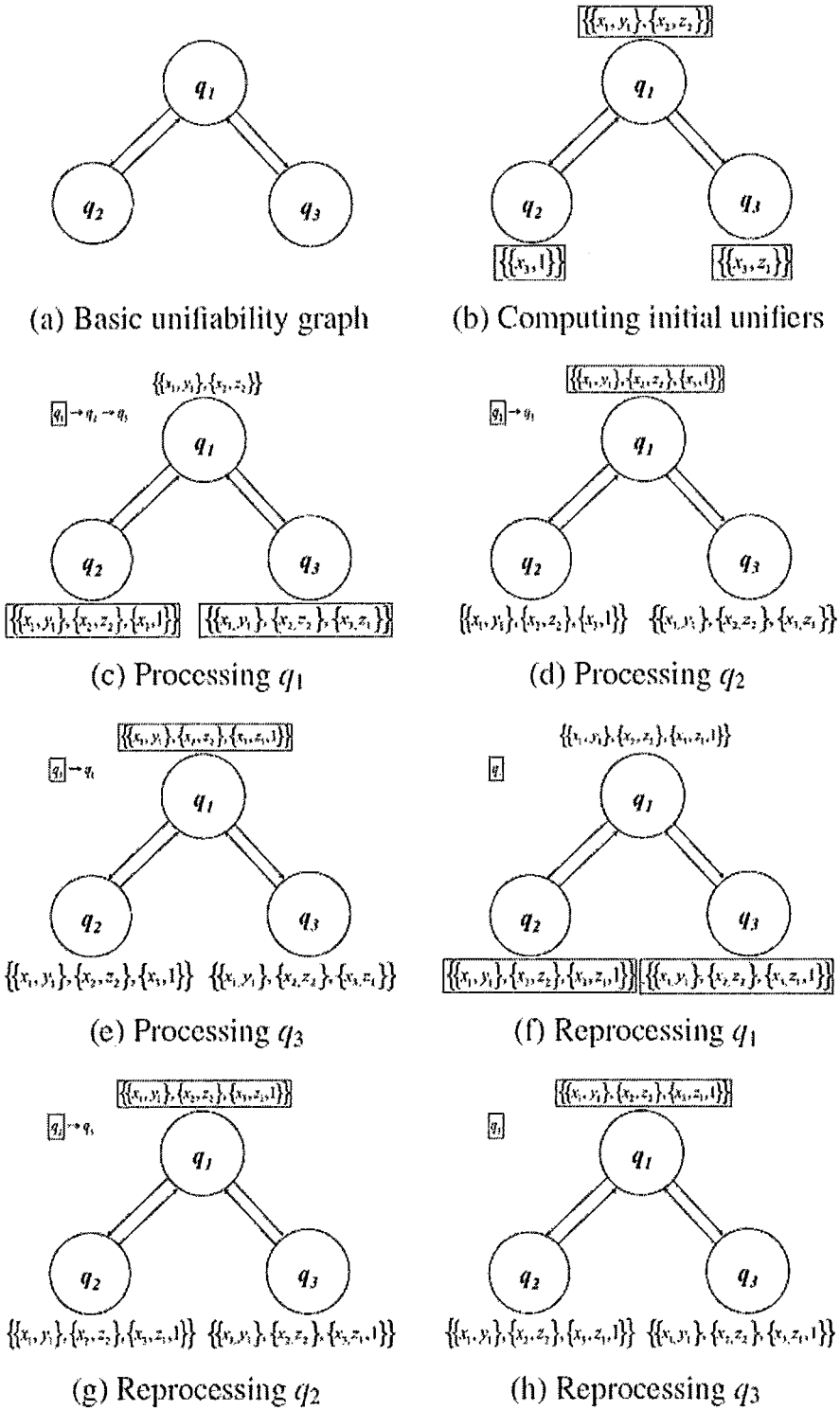
FIG. 5 illustrates query matching according to one embodiment of the invention.

Equality holds if and only if every post-condition atom of $q_i$ unifies with a head atom of some query. For instance, if Q consists of the three following queries:

$q_1$: {$R(x_1)\char`\^S(x_2)$}$T(x_3)$:–$D1(x_i,x_2,x_3)$ $q_2$: {$T(1)$}$R(y_1)$:–$D2(y_1)$ $q_3$: {$T(z_1)$}$S(z_2)$:–$D3(z_1,z_2)$, then the unifiability graph is as shown in FIG. 5(a). The unifiability graph allows Q to be partitioned into subsets that may be processed separately and in parallel. These partitions are precisely the connected components of the unifiability graph. For example, the queries corresponding to a connected component of the unifiability graph may be referred to as a component of Q. Suppose that queries $q_1$ and $q_2$ are in different components of Q. Then any coordinating set that contains groundings of both $q_1$ and $q_2$ may be broken into two smaller disjoint coordinating sets—one of which contains $q_1$ and the other of which contains $q_2$.

All subsequent stages of evaluation may therefore be performed separately on each component of Q. Partitioning the graph has other potential benefits in addition to the performance advantages associated with increased parallelization and smaller search spaces. For instance, it has security benefits. By analyzing the unifiability graph, an implementation of the system could provide guarantees about the interaction between different queries in the system. A system sensitive to privacy could partition the workload by grouping queries into sets of "trusted and sensitive", "trusted but not sensitive", or "untrusted" queries and ensure that no component of Q could contain both a "trusted and sensitive" and an "untrusted" query.

At the core of the algorithm is an iterative process that identifies and removes unanswerable queries, i.e., those that have no chance to participate in a coordinating set. Fundamental to the algorithm is the observation that a query with a post-condition that does not unify with any query's head may not have a grounding that participates in a coordinating set. Any such query may therefore be safely disregarded. Such queries may be identified using the unifiability graph. A query node $N(q_i)$ may be safely removed from the graph if its INDEGREE is strictly less than the number of post-conditions of $q_i$.

Unifier propagation requires that no variable may appear in more than one query. If the initial Q does not satisfy this property, it is easy to enforce the unifier propagation by renaming variables as needed. For simplicity, it is assumed that each variable is indeed unique to a single query. The term "Val" denotes the set of all constants and variables occurring in Q.

The matching algorithm associates a unifier U(n) with each node n in the unifiability graph. A unifier is a constraint on the valuations of the variables in Val. Formally, it is a partition of a subset of Val which contains at most one constant per partition class. It may be represented as a set of subsets of Val. For example, {{x, 3}, {y, z}} is a unifier specifying that in any permitted valuation, the variable x must have value 3 and the variables y and z must have the same value.

Given unifiers $u_1$ and $u_2$, the Most General Unifier ("MGU") of $u_1$ and $u_2$, denoted mgu($u_1$, $u_2$), is the most general or least restrictive unifier that enforces all the constraints imposed by each $u_i$. In general, mgu($u_1$, $u_2$) may not exist, but if it does exist then it is unique. For instance, there is no most general unifier for the unifiers {{x, 3} and {x, 4}}—if one existed, it would need to restrict valuations so that x was equal to both 3 and 4.

Given two unifiers $u_1$ and $u_2$, it is possible to compute mgu($u_1$, $u_2$), or determine that it does not exist, using standard methods. An optimized implementation of the MGU procedure based on disjoint-set forests provides strong performance guarantees. If unifiers $u_1$ and $u_2$ jointly contain k distinct variables then it is possible to compute their most general unifier in expected O(k·α(k)) time, where α is the inverse of the Ackermann function.

There are cascading effects of unifier propagation. For example, if a query node $q_i$ is removed from the graph, then any node $q_j$ must be removed such that a post-condition atom of $q_j$ unifies with ahead atom of $q_i$. This is true because of the safety condition. It is known that each post-condition atom unifies with at most one head atom.

This means that if a node $q_i$ is removed from the unifiability graph then every successor $q_j$ of $q_i$ maybe removed as well. Repeating this position, every successor of a successor of $q_i$ may be removed, and so on until all descendants of $q_i$ have been removed from the graph. This may be accomplished using a standard graph traversal algorithm such as Breadth-First Search. A function CLEANUP(n) is assumed to remove an input node and all its descendants from the dependency graph, as well as all edges into and out of those nodes. The function CLEANUP(n) is also assumed to remove all of these nodes from the "updates queue" described more fully below.

The query matching algorithm is now explained. A unifiability graph for the set of queries Q is constructed. For each query $q_i$ in Q, a node is created, and a set $U(q_i)$, called the unifier, is defined for this node. Intuitively, $U(q_i)$ represents the minimal or least restrictive currently known constraints on valuations that must hold for any coordinating set that contains a grounding of $q_i$.

The unifier $U(q_i)$ of each node $q_i$ to the empty set is initialized. For each head atom h of each query $q_i$, a check is made to determine whether there is a post-condition atom p of a query $q_j$ that unifies with it. If such a p exists then an edge from $q_i$ to $q_j$ in the unifiability graph is created. $U(q_j)$ is updated to be the MGU of $U(q_j)$ and the most general unifier of p and h. If no such h exists or no MGU exists, then the query $q_i$ is unsatisfiable, and a CLEANUP may be run to remove the head atom h and all its descendants from the graph.

The unifiability graph may be generated in a straightforward but inefficient manner by trying to unify each post-condition with each head in the entire input set of queries. This process may be made more efficient by building indices, but doing so is non-trivial. For example, considering the atoms Reserve (Kramer, x) and Reserve (Jerry, y), a unifier does not exist for these atoms despite the fact that they point to the same relation. Interestingly, the number of these matchings may be reduced by simply replacing the variables in every atom by a unique constant Δ. Then an index on all heads in Q may be built in the following form:

(Relation,Parameter,Value)→[List of Atoms]

A lookup for a post-condition atom Reserve (Jerry, y) involves a seek on the index for (Reserve, 1, Jerry) and (Reserve, 1, Δ). Formally, if $\mathcal{L}$ denotes the lookup function on the index and $\mathcal{A}$ represents the set of atoms, an atom $R(v_1 \ldots v_n)$ may only unify with $$\mathcal{A} \cap \bigcap_{\text{constants } v_i} (\mathcal{L}(R, i, v_i) \cup \mathcal{L}(R, i, \Delta))$$

Such an index structure does not provide any guarantee on complexity. Indeed, the index structure is expected to perform poorly when queries have many variables. However, a query set with a very large number of variables is highly likely to be unsafe. Post-conditions and heads that contain mostly variables rather than constants will typically unify with each other densely. In practice, therefore, this type of index is immensely useful.

In building the graph, any query containing a post-condition that did not unify with some head atom is iteratively removed. This removal, together with the assumption that Q is safe, is sufficient to guarantee that for each post-condition p of each query $q_i$ in the graph, there is exactly one other query $q_j$ with a head h that unifies with p. This establishes a local satisfaction of constraints for each of the remaining nodes in the dependency graph. The algorithm next propagates these constraints using the structure of the unifiability graph. More specifically, if a post-condition of query $q_j$ requires the head of some query $q_i$ for satisfaction, the coordinating set may not contain a grounding of $q_j$ unless both $q_j$'s existing constraints and $q_i$'s constraints hold.

Unifier propagation is an iterative procedure that runs on each component of the unifiability graph. As it runs, it performs two tasks. First, unifier propagation discovers the coordination structure, i.e., how the queries match with respect to satisfying each other's post-conditions. As the unifier propagation does this, it updates the unifiers associated with the graph nodes to reflect the current known constraints on valuations that are required for this query to be answerable. Simultaneously, the algorithm discovers and removes unanswerable queries from the graph. One embodiment of an exemplary algorithm for matching on a unifiability graph G is shown by the following pseudo-code:

```
1:  updates := queue containing all nodes in G
2:  while updates is not empty do
3:      parent := DEQUEUE(updates)
4:      for child in successors of parent do
5:          U(child) := MGU(U(parent) , U(child))
6:          if U(child) was changed then
7:              if U(child) = NIL then
8:                  CLEANUP(child)
9:              else
10:                 ENQUEUE (updates, child)
11:             end if
12:         end if
13:     end for
14: end while
```

At a high level, the algorithm pushes unifier information forward along edges. If a unifier does not exist for some node $q_i$ then the CLEANUP function is invoked on $q_j$, removing it and all its descendants from the unifiability graph and the updates queue. The intuition is that such a node corresponds to an unanswerable query, and any descendants of this node represent queries that relied on a post-condition of $q_i$ for satisfaction, so are also unanswerable. Whenever the unifier of a node is updated, that node is added to the updates queue so that the change may be propagated to the node's children. This propagation of unifier information continues until no new information is propagated by any of the nodes and the updates queue becomes empty.

The execution of the algorithm on the embodiment as described with respect to the users Kramer and Jerry is shown in FIGS. 5(a)-5(h). Again, FIG. 5(a) illustrates a basic unifiability graph. In FIG. 5(b), unifiers are computed for all nodes in the graph, and all nodes in the graph are added to the updates queue. In FIG. 5(c), the first node, $q_1$, is removed from the head of the queue and information about its constraints is propagated to its successors $q_2$ and $q_3$. In FIG. 5(d), $q_2$ is removed from the queue and information about its constraints is propagated to its child $q_1$. Since $q_1$ is not currently in the queue, it is added at this point. In FIG. 5(e), $q_3$ is removed from the queue and its constraints are propagated to its child $q_1$. In FIG. 5(f), $q_1$ is processed again with its new unifier, and information about the update is propagated to $q_2$ and $q_3$. In FIG. 5(g) and FIG. 5(h), the update is propagated to $q_1$, but since $U(q_1)$ is not changed by the operation, it is not added to the queue.

A variant of this example in which $q_3$ has the post-condition T(2) rather than $T(z_1)$ is now considered. In this case, no choice of head atoms for $q_1$ may simultaneously satisfy the post-conditions of $q_2$ and $q_3$, so it is expected that the matching algorithm should fail. Indeed, immediately before FIG. 5(e), $U(q_2)$ will contain the set $\{x_3, 1\}$ and $U(q_3)$ will contain the set $\{x_3, 2\}$. The unifier of $q_1$ is updated first to mgu $(U(q_1), U(q_2))$ and then to the unifier of that value with mgu $(U(q_1), U(q_2))$. The last unification will require $x_3$ to be equal to 1 and 2 simultaneously, and that unification will therefore fail. As expected, the matching algorithm will consequently eliminate the node $q_1$ and its children $q_2$ and $q_3$.

The complexity of constructing the unifiability graph is analyzed. H denotes the total number of head atoms in all queries in Q, P denotes the total number of post-condition atoms, and κ denotes the greatest number of columns that appears in any single atom in Q. In the absence of any indices, for each head atom h and post-condition atom p in Q, whether h unifies with p is checked. Each such check takes expected $O(\kappa \alpha(\kappa))$ time. If h is fixed, then the check with P must be performed with different values of p. Since every query in Q contains at least one post-condition atom, the time required to find all post-condition atoms and perform this loop is expected as $O(P\kappa \alpha(\kappa))$. This inner loop for H is performed with different values of h. Since each query in Q has at least one head atom, finding all the head atoms in the input and iterating over all of them takes expected $O(PH\kappa \alpha(\kappa))$ time.

The input of the algorithm is a connected component to the unifiability graph containing nodes $Q' \subset Q$ such that each variable appears in at most one query in Q', as well as a unifier for each node in the graph. It is assumed that all queries in the input jointly contain κ free variables and that w represents the maximum number of post-conditions of any query in Q. P represents the total number of post-condition atoms in every query in the graph and n represents the number of queries in Q'.

A node is added to the updates queue only at the very beginning of the algorithm or when its unifier is updated by a call to the MGU function (for example, on line 5 of the algorithm pseudo-code). Assuming that there are no variables in the input, i.e., k=0, unification is trivial. Unifiers are never changed, and the whole algorithm runs in time proportional to the number of edges in the graph, which bounded above by O(P) time.

In instances when k>0, if a unifier is updated by a call to the MGU function then either the new unifier must contain a constant that the old unifier did not contain or else two sets in the old unifier must be merged together and the total number of sets in the unifier must decrease. Therefore, if all queries in the input jointly contain k free variables then for each node child in Q', the check on line 6 of the algorithm pseudo-code may succeed at most O(k) times. If every node q in the input has INDEGREE at most w then each node may be added to the updates queue at most O(kw) times. It follows that lines 5-12 of the algorithm pseudo-code may be executed at most once $O(kw^2)$ for each node in the graph. Each execution takes expected $O(k \cdot \alpha(k))$ time if the time spent in the CLEANUP function is ignored on line 8 of the algorithm pseudo-code. Therefore, the running time of the loop is expected $O(k^2 \ w^2 \cdot \alpha(k))$. The total time spent in the CLEANUP function across all calls is at worst linear in the number of nodes in the input. It follows that the entire procedure runs in $O(k^2 \ w^2 \alpha(k)+n+P)$ time. Since every query in the input contains at least one post condition, this may be simplified to expected $O(k^2 \ w^2 \alpha(k)+P)$ time.

At any given time, the unifier of a query node q represents the weakest constraints on variables that must hold in order for there to be a coordinating set of groundings for a subset $Q' \subset Q$ that contains exactly one grounding for each query in Q'. A node is removed from the graph only when this is known to be impossible, either because some of its post-conditions may not be satisfied at all or because some subset of its post-conditions may not be mutually satisfied by any variable assignment. This is generally what may be done without any knowledge of the records in the data source. The unifier of any query that remains in the system after the matching algorithm halts may be satisfied for some valuation of the variables it contains. This means that for each remaining query q there exists a data source D, a set of groundings $\overline{Q} \subset Q'$, and a coordinating set of groundings $\mathcal{G}$, such that $q \in \overline{Q}$ and $\mathcal{G}$ consists of exactly one grounding for each $g \in \mathcal{G}$.

After the matching procedure finishes, a set of answerable queries $Q=\{q_i\}_{i \in 1}$ is left, each associated with a unifier $U(q_i)$, such that Q is a subset of the current component of Q' of Q. A global unifier U is computed for the whole set of queries as $mgu(\{U(q_i)\})$. If such a U cannot be computed, evaluation fails for Q' and all the queries in Q' are rejected. If U does exist, then it may be expressed as a conjunction of equality statements relating the variables and constants involved, referred to herein as $\varphi U$.

At this point, the algorithm creates a combined query using Q and $\varphi U$. With $B_i$ denoting the body of query $q_i$, and $H_i$ denoting the conjunction of its head atoms, then the combined query q* is:

$$\bigwedge_i H_i : - \bigwedge_i B_i \wedge \varphi_U$$

That is, the body of q* is the conjunction of all the bodies of the original queries, together with equality atoms that encode the constraints in u. The head of q* is the conjunction of the original query heads.

Turning to FIGS. 5(a)-5(h), all query nodes end up with the same unifier after matching. This is:

$$\{\{x_1,y_1\},\{x_2,z_2\},\{x_3,z_1,1\}\}$$

The required most general unifier U is consequently also $$\{\{x_1,y_1\},\{x_2,z_2\},\{x_3,z_1,1\}\}$$

A suitable corresponding $\varphi U$ is:

$$x_1=y_1 \wedge x_2=z_2 \wedge x_3=z_1 \wedge x_3=1$$

The combined query generated by the system is as follows:

$$T(x_3) \wedge R(y_1) \wedge S(z_2):-D1(x_1,x_2,x_3) \wedge D2(y_1) \wedge D3(z_1,z_2)$$

$$\wedge x_1=y_1 \wedge x_2=z_2 \wedge x_3=z_1 \wedge x_3=1$$

As this example makes clear, q* may be simplified making use of the information in $\varphi U$. The example query is equivalent to the following query:

$$T(1) \wedge R(x_i) \wedge S(x_2):-D1(x_1,x_2,x_3) \wedge D2(x_1) \wedge D3(1,x_2)$$

Once q* is constructed, it may be sent to the data source for evaluation. Each answer to q* is a valuation of the variables in q* that corresponds to a set of fully grounded head atoms. Only one such valuation is necessary to answer the entangled queries, so q* may be equipped with a LIMIT 1 clause. Once an answer is available, the fully grounded head atoms may be used to generate answers for the individual queries from Q in a straightforward manner.

It is contemplated that the invention provides end-to-end coordination support. For instance, all levels of the system handle not just coordination success, but coordination failure as well. Suppose Kramer submits his query as in the first example, but Jerry's matching query never arrives. The system includes a suitable mechanism for dealing with this situation, such as ultimately sending a message to the transaction code that the query is not answerable. As another example, suppose Kramer and Jerry do coordinate, but Kramer's transaction aborts before he makes the booking. The coordination has created a dependency between their transactions which is considered during recovery.

Figure 6:
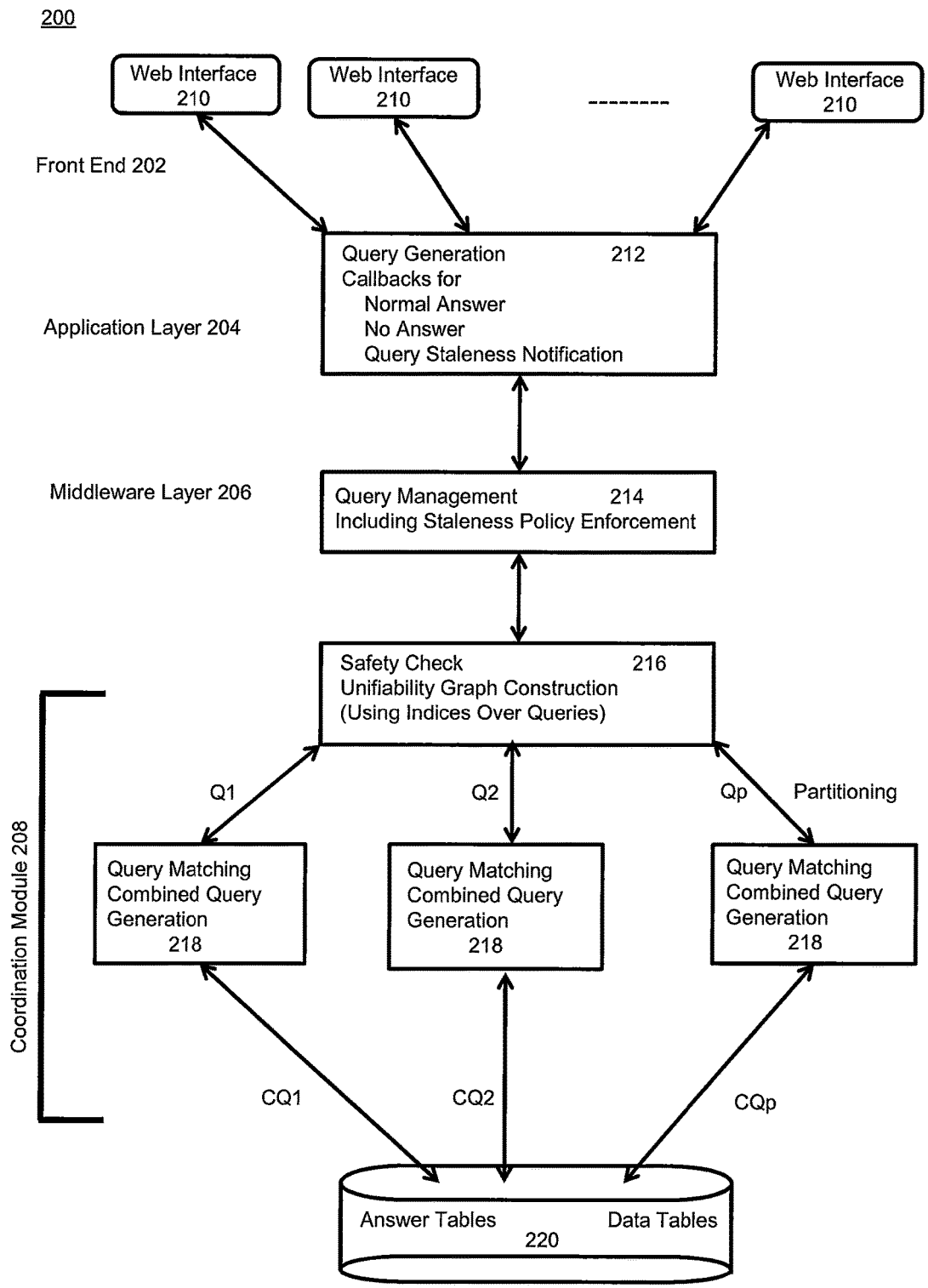
FIG. 6 illustrates a structure for processing entangled queries according to one embodiment of the invention.

FIG. 6 illustrates a structure 200 for processing entangled queries according to one embodiment of the invention. The system and network that may implement the structure 200 is discussed more fully in reference to FIG. 11 and FIG. 12.

Entangled queries may, in principle, be input by hand, but normally they are generated by a front end 202 user interface 210 such as a web page. Once a query is generated, it is passed to a suitable layer for answering, for example an Application Layer 204 of an Internet Protocol Suite ("TCP/IP") or Open Systems Interconnection ("OSI") model of a computer network. At the Application Layer 204, query generation and callbacks 212 are implemented.

Coordinated answering is an asynchronous process. An individual query may not in general be answerable until other, partner queries are available. A Middleware Layer 206 provides for query management including staleness policy enforcement 214. A staleness policy is considered since it is unrealistic for an entangled query to wait an arbitrary amount of time for a coordination partner. When a query becomes stale, it is removed from the list of pending queries and its evaluation is considered to have failed. Staleness may be defined in a variety of ways, for example, a timeout mechanism or manual user intervention may be used.

Below the Middleware Layer 206, a dedicated module actually performs the coordination 208. The structure of this module 208 directly mirrors the algorithm discussed above. The algorithm receives a stream of queries and constructs the unifiability graph using suitable indices over the queries 216. Subsequently, each component of the graph may be processed by an independent server thread, which performs the actual query matching and generates a combined query 218. The combined query is then sent to the data source 220 for evaluation. The data source 220 may include a query optimizer that applies traditional query optimization techniques in evaluating the combined query. Once the coordination module 208 computes answers to the individual entangled queries, these answers are returned.

The implementation of the coordination module 208 consists of a server which may accept connections and queries from a hundred clients. The algorithm may be executed periodically in a set-at-a-time fashion (after specific time intervals or after a fixed number of queries). Alternately, it may be executed incrementally upon submission of every query. On the arrival of a new query in the system, the unifiability graph maybe updated and only certain partitions may require updates. The incremental evaluation requires each partition to store the partial matching unifiers and continues the algorithm from this state with the addition of a new query. A parameter in the implementation allows switching between the two options.

To illustrate the invention, one embodiment is directed to a simulated flight booking scenario in which users want to coordinate their travel plans with their friends. Social network data may be used to establish friendship relationships between the users. The unifiability graph has 82,168 users and 102 airport destinations. A "hometown" airport is assigned to each of the users, ensuring that that each user has at least half of his or her friends living in the same city.

The schema is represented by the following:

```
Reserve(UserName, Destination)
Friends(UserName1, UserName2)
User(UserName, HomeTown)
```

In the following, R, F and U are used to denote the Reserve, Friends and User tables, respectively. Within this flight booking scenario, different coordination scenarios and different workloads are considered.

The scalability of coordination is reviewed in an increasingly complex set of scenarios and the query matching and safety check procedures are also reviewed.

Turning to the scalability of coordinated query answering in a basic scenario where pairs of friends want to coordinate flights, the query sets used consist of pairs of queries of the following form:

```
{R(x, ITH)} R(Jerry, ITH) :-
    F(Jerry, x) ∧ U(Jerry, c) ∧ U(x, c)
{R(x, ITH)} R(Kramer, ITH) :-
    F{Kramer, x) ∧ U(Kramer, c) ∧ U(x, c)
```

The intuition is that the above pair of queries is generated by Jerry and Kramer who each want to fly to a particular airport—John F. Kennedy ("JFK") in New York, N.Y.—with any of their friends. When generating such query pairs, Jerry and Kramer are identified as friends according to the social network structure (but it is not required that Jerry and Kramer are identified as living in the same city). Enforcing only one of these two conditions in query generation allows queries to be produced that have a realistic—not too small and not too large—chance to coordinate.

Figure 7:
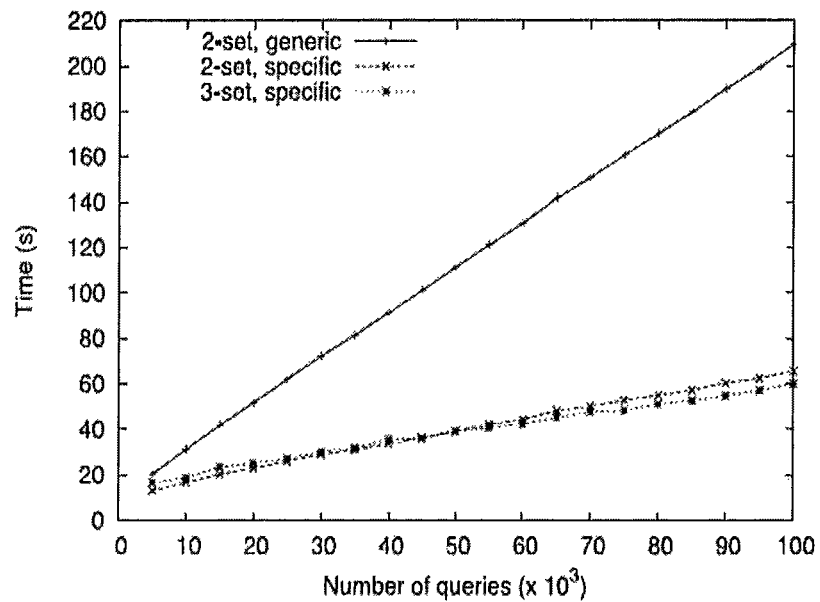
FIG. 7 illustrates a graph of scalability on best case and random workload according to one embodiment of the invention.

The size of the query sets are varied from five to one hundred thousand. In addition, the approach is evaluated on a randomly permuted set of mutually coordinating pairs of queries to detect any side effects of the incremental query evaluation approach. FIG. 7 illustrates the results.

Although the heads and post-conditions of all queries point to the same ANSWER relation, the performance is linear in the number of queries. The performance is linear due to the fact that queries coordinate often and the number of "pending" queries does not grow with an increase in the number of queries.

In an embodiment that makes queries more specific, the variables are eliminated from the post-condition and the head, so that the queries are of the following form:

```
{R(Kramer, ITH)} R(Jerry, ITH) :-
    F(Jerry, Kramer) ∧ U(Jerry, c) ∧ U(Kramer, c)
{R(Jerry, ITH)} R(Krainer, ITH) :-
    F(Kramer, Jerry) ∧ U(Kramer, c) ∧ U(Jerry, c)
```

As discussed previously, F and U were required to be joined to ground the value of x. However, with the complete specification of friends, this requirement is eliminated and the grounding step is faster. This leads to an increase in performance, as shown in FIG. 7. The overall performance, however, remains linear in the number of queries.

Reviewing scalability in a slightly more complex scenario, triples of queries are generated that correspond to triangles in the social network structure, which are represented by:

```
{R(Kramer, IAH)} R(Jerry, IAH) :-
    F(Jerry, Kramer) ∧ U(Jerry, c) ∧ U(Kramer, c)
{R(Elaine, IAH)} R(Kramer, IAH) :-
    F(Kramer, Elaine) ∧ U(Kramer, c) ∧ U(Elaine, c)
{R(Jerry, IAH)} R(Elaine, IAH) :-
    F(Elaine, Jerry) ∧ U(Elaine, c) ∧ U(Elaine, c)
```

The size of the query set is varied within the same parameters as before. FIG. 7 shows the results.

The performance impact of an increase in the complexity of the coordination required is now investigated. Specifically, the number of post-conditions per query is increased from one to five with all queries having the same number of post-conditions. A sample set of three queries with two post-conditions is given below.

```
{R(Jerry, SBN)∧ R(Kramer, SBN)} R(Elaine, SBN) :-
    F(Elaine, Jerry)∧ F(Elaine, Kramer)∧
    U(Kramer, c)∧ U(Elaine, c)∧ U(Jerry, c)
{R(Elaine, SBN)∧ R(Kramer, SBN)} R(Jerry, SBN) :-
    F(Jerry, Elaine)∧ F(Jerry, Kramer)∧
    U(Kramer, c)∧ U(Jerry, c)∧ U(Elaine, c)
{R(Elaine, SBN)∧ R(Jerry, SBN)} R(Kramer, SBN) :-
    F(Kramer, Elaine)∧ F(Kramer, Jerry)∧
    U(Jerry, c)∧ U(Kramer, c)∧ U(Elaine, c)
```

This sample set of three queries represents a scenario where Elaine wants to travel with both her friends, Jerry and Kramer. Jerry and Kramer have analogous requirements. Cliques in the social graph are required for coordination, rather than just cycles. The intent of the coordination is that they all travel together from the same city to the same destination. Queries with a greater number of post-conditions are generated in a similar fashion. Increasing the number of post-conditions is associated with an increase in the number of queries that must be matched for successful coordination.

Figure 8:
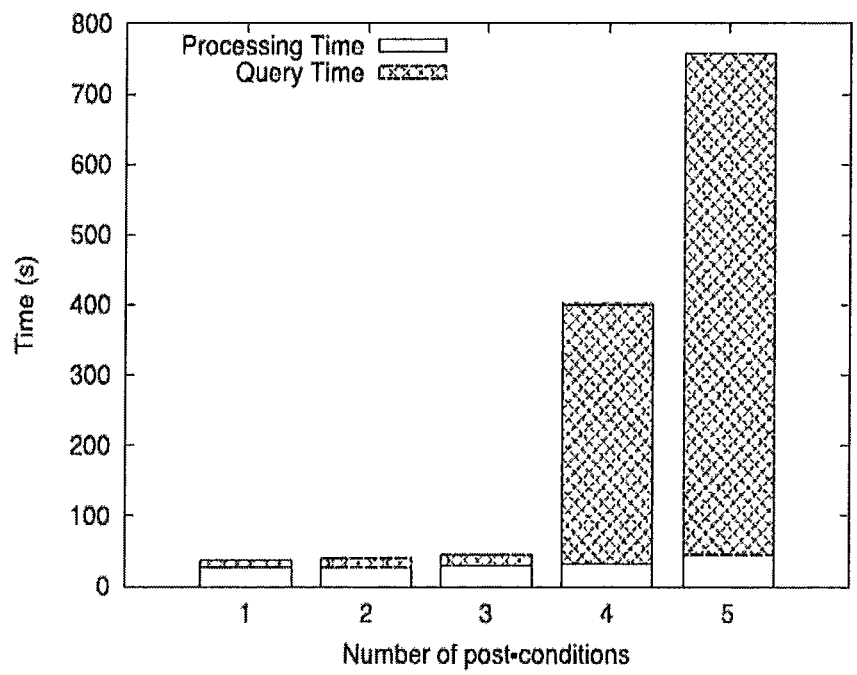
FIG. 8 illustrates a graph of scalability in the number of post-conditions according to one embodiment of the invention.

FIG. 8 shows two components of the result obtained by executing 10,000 queries. The first component corresponds to the time taken by the algorithm to find matching sets of queries, and the second part corresponds to the time taken by the data source for query evaluation. The data source performs very poorly when a certain threshold is surpassed. However, the time required to find matching sets of queries is still within reasonable bounds in the number of post-condition atoms.

Now query matching and safety check procedures are reviewed. Specifically, query matching performance is reviewed for workloads where little coordination may take place because most queries are unanswerable.

A query set is used that is generated to ensure that no query has a post-condition unifying with the head of another query. In this case, the unifiability graph does not have any edges. However, with the arrival of each query, index looks are performed to check for new edges. The unifier propagation phase of the algorithm is never initiated because post-condition and head atoms never unify. As expected the "no coordination, no unification" curve in FIG. 9 is near-linear.

Figure 9:
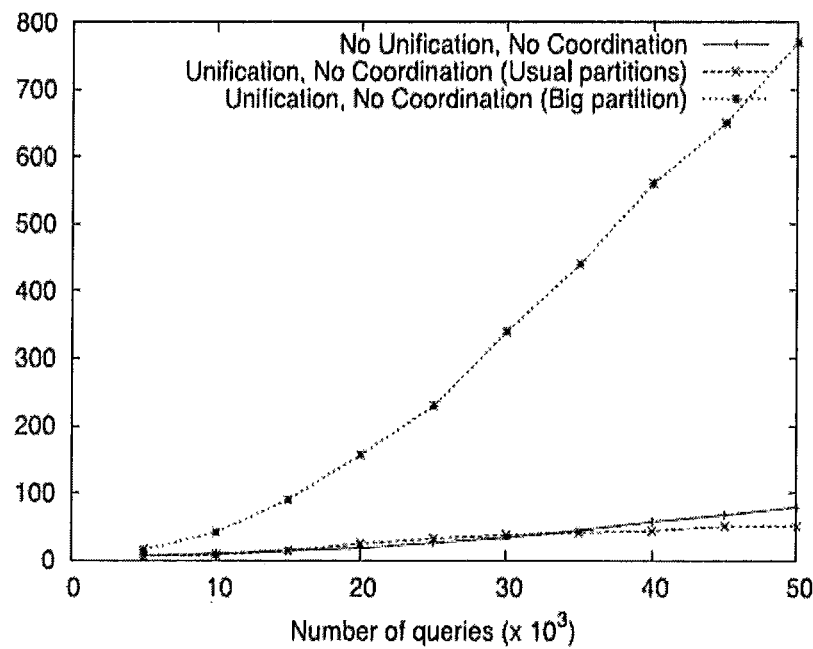
FIG. 9 illustrates a graph of scalability when queries do not match according to one embodiment of the invention.

As the "usual partitions" line in FIG. 9 shows, the query evaluation time is near-linear even though there is an increase in the number of pending queries (as no matching takes place) and many queries unify. In other words, the current set of queries forms a long chain in the unifiability graph, but does not form cycles. The clustering in the social network graph allows the partitions of the unifiability graph to stay within a certain bound explaining the high throughput on the query set with high unification, but no matching.

Next a single large cluster is identified in the social network graph and a set-at-a-time evaluation of such massively unifying partitions occurs. FIG. 9 shows the performance of such a process. It is still within reasonable bounds, given that thousands of people are trying to coordinate together. For extremely huge coordinating groups, it is established that evaluating the queries set-at-a-time is feasible. By doing so, it is preferable to wait till all coordination partners arrive before running the algorithm.

Figure 10:
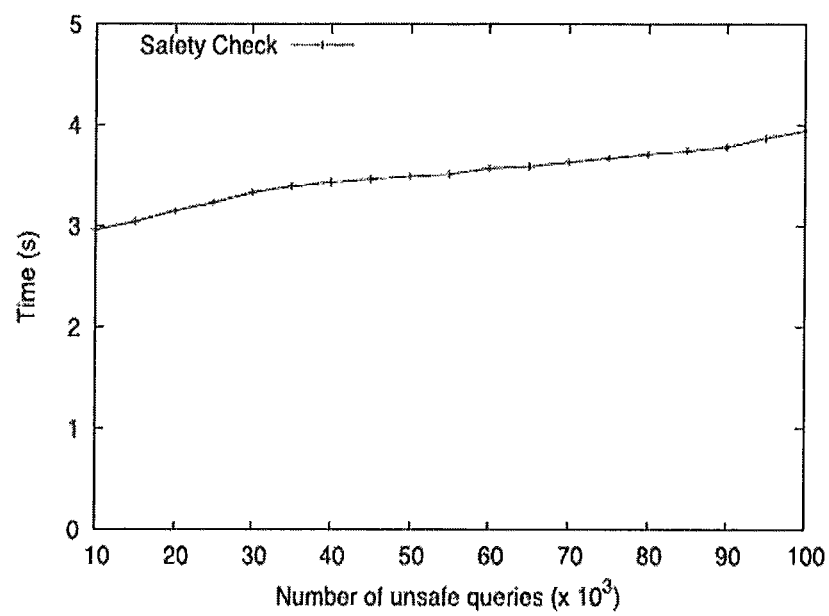
FIG. 10 illustrates a graph evaluation time for safety check according to one embodiment of the invention.

The performance of the safety check is considered by loading twenty thousand queries that are unable to coordinate. Then, large sets of queries are added. Such sets contain queries that will fail the safety check with respect to the queries already present. The size of such sets of queries is varied from five to one hundred thousand. The results are shown in FIG. 10. FIG. 10 clearly shows that the safety check does not add significant overhead to the system.

As presented, the algorithm is efficient in removing queries that are unable to be matched with others and queries that cause safety violations. The queries that are matched may be evaluated efficiently. The overall evaluation algorithm scales to workloads which are realistically sized with respect to today's social networks.

It is contemplated that the syntax for entangled queries could be extended with features such as disjunction, union, and aggregation in WHERE clauses. For example, a data source may contain three tables: a table "Parties" with schema (pid, pdate), a table "Friend" with schema (name1, name2), and a relation "Attendance" with schema (pid, name). Suppose a user named Jerry wants to attend a party on Friday subject to the constraint that more than five of his friends attend this same party. This could be expressed as follows using aggregation:

```
SELECT party_id, 'Jerry' INTO ANSWER Attendance
WHERE
    party_id IN (SELECT pid
                 FROM Parties
                 WHERE pdate='Friday')
AND
   (SELECT COUNT(*)
    FROM ANSWER Attendance A, Friend F
    WHERE party_id = A.pid AND
          A.name = F.name2 AND
          F.name1 = 'Jerry') > 5
CHOOSE 1
```

"Soft" preferences, another possible extension of entangled queries, would allow coordination constraints to be relaxed when full coordination is difficult. For example, if Jerry and Kramer have trouble obtaining matching travel itineraries, they could instead request that their respective travel dates be as close together as possible.

It is also desirable to allow users to specify a ranking function on preferred query groundings. In the travel example, users who are coordinating on travel dates may prefer some dates to others. Disregarding their preferences maybe acceptable if satisfying them precludes coordination, but the evaluation algorithm should favor coordinating sets $\mathcal{G}$ that satisfy the users' preferences.

Finally, many applications could benefit from extended semantics that allow a query to return more than one answer tuple. Such semantics may allow users to request that all groundings of a query be included in the coordinating set, or that as many as possible be included up to some limit k. For instance, in a coordination-aware course enrollment system, students might request that they be enrolled in the same courses as their friends while the registrar ensures that no student enrolls in more than four courses.

Figure 11:
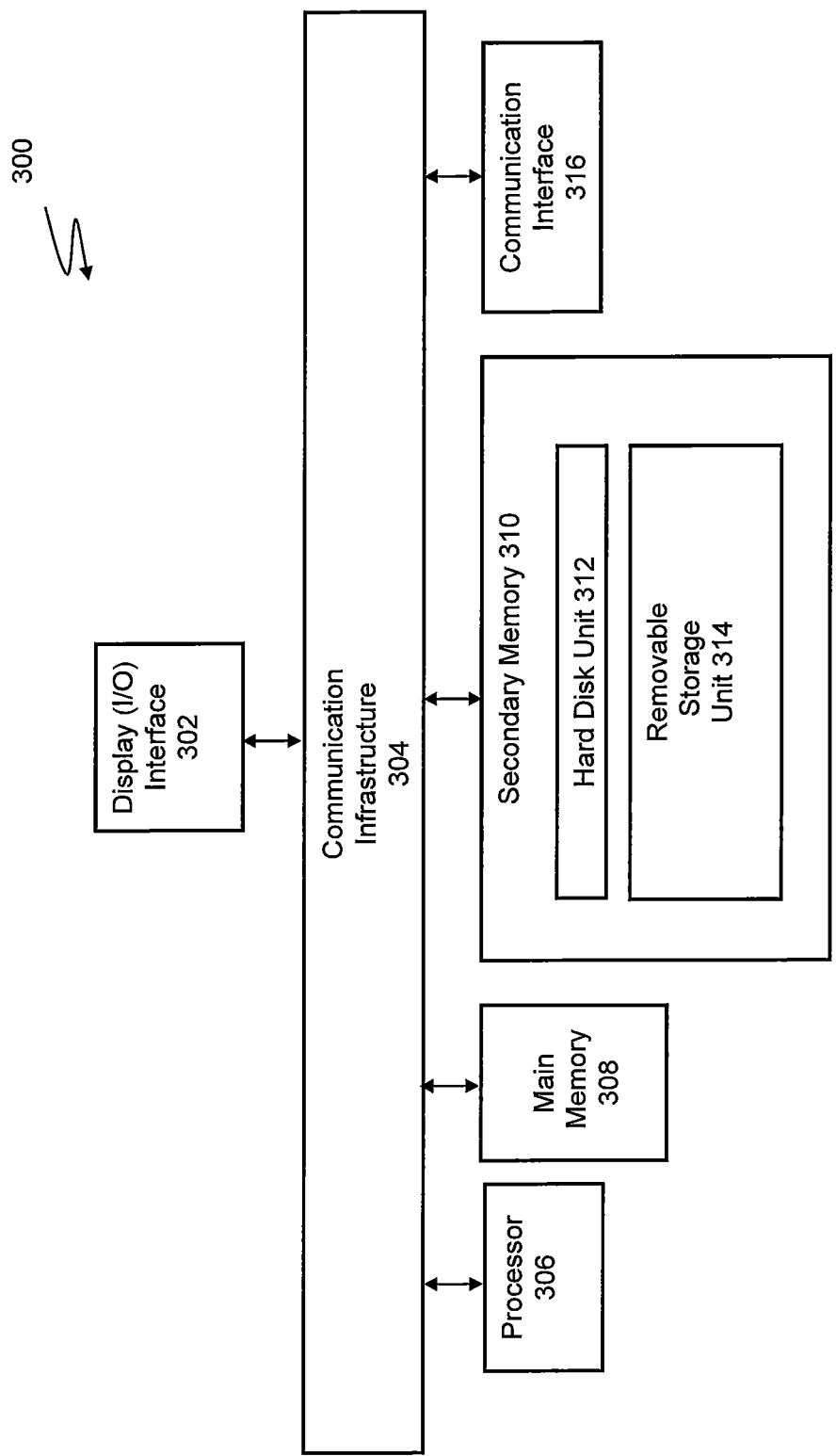
FIG. 11 illustrates an exemplary computing device that may be used to implement the methods according to one embodiment of the invention.

FIG. 11 illustrates an exemplary computing device 300 that may be used to implement the methods according to the invention. One or more computing devices 300 may carry out the methods presented herein as computer code. To facilitate greater mobility, the computing device 300 may be handheld and include any small-sized computing device including a display interface. Examples of such devices include a personal digital assistant ("PDA"), smart hand-held computing device, cellular telephone, or a laptop or netbook computer, hand held console or MP3 player, tablet, or similar hand held computer device, such as an iPad®, iPad Touch® or iPhone®.

Computing device 300 includes an input/output display interface 302 (which facilitates access to a user interface such as an Internet web page) connected to communication infrastructure 304—such as a bus—, which forwards data such as graphics, text, and information between the communication infrastructure 304 or from a frame buffer (not shown) to other components of the computing device 300. The input/output display interface 302 may be, for example, a keyboard, touch screen, joystick, trackball, mouse, monitor, speaker, printer, any other computer peripheral device, or any combination thereof, capable of entering and/or viewing data.

Computing device 300 includes one or more processors 306, which may be a special purpose or a general-purpose digital signal processor that processes certain information. Computing device 300 also includes a main memory 308, for example random access memory ("RAM"), read-only memory ("ROM"), mass storage device, or any combination thereof. Computing device 300 may also include a secondary memory 310 such as a hard disk unit 312, a removable storage unit 314, or any combination thereof.

Computing device 300 may also include a communication interface 316, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc. It is contemplated that the computing device may also use a system of interconnected computer networks including cloud computing networks described more fully in reference to FIG. 12.

It is contemplated that the main memory 308, secondary memory 310, communication interface 316, or a combination thereof, function as a computer usable storage medium, otherwise referred to as a computer readable storage medium, to store and/or access computer software including computer instructions. For example, computer programs or other instructions may be loaded into the computing device 300 such as through a removable storage device, for example, a floppy disk, ZIP disk, magnetic tape, portable flash drive, optical disk such as a CD or DVD or Blu-ray, Micro-Electro-Mechanical System ("MEMS"), or nanotechnological apparatus. Specifically, computer software including computer instructions may be transferred from the removable storage unit 314 or hard disc unit 312 to the secondary memory 310 or through the communication infrastructure 304 to the main memory 308 of the computing device 300.

Communication interface 316 allows software, instructions and data to be transferred between the computing device 300 and external devices or external networks. Software, instructions, and/or data transferred by the communication interface 316 are typically in the form of signals that may be electronic, electromagnetic, optical, or other signals capable of being sent and received by the communication interface 316. Signals may be sent and received using wire or cable, fiber optics, a phone line, a cellular phone link, a Radio Frequency ("RF") link, wireless link, or other communication channels.

Computer programs, when executed, enable the computing device 300, particularly the processor 306, to implement the methods of the invention according to computer software including instructions.

The computing device 300 described herein may perform any one of, or any combination of, the steps of any of the methods presented herein. It is also contemplated that the methods according to the invention may be performed automatically, or may be invoked by some form of manual intervention.

The computing device 300 of FIG. 11 is provided only for purposes of illustration, such that the invention is not limited to this specific embodiment. It is appreciated that a person skilled in the relevant art knows how to program and implement the invention using any structure for a computing device.

Figure 12:
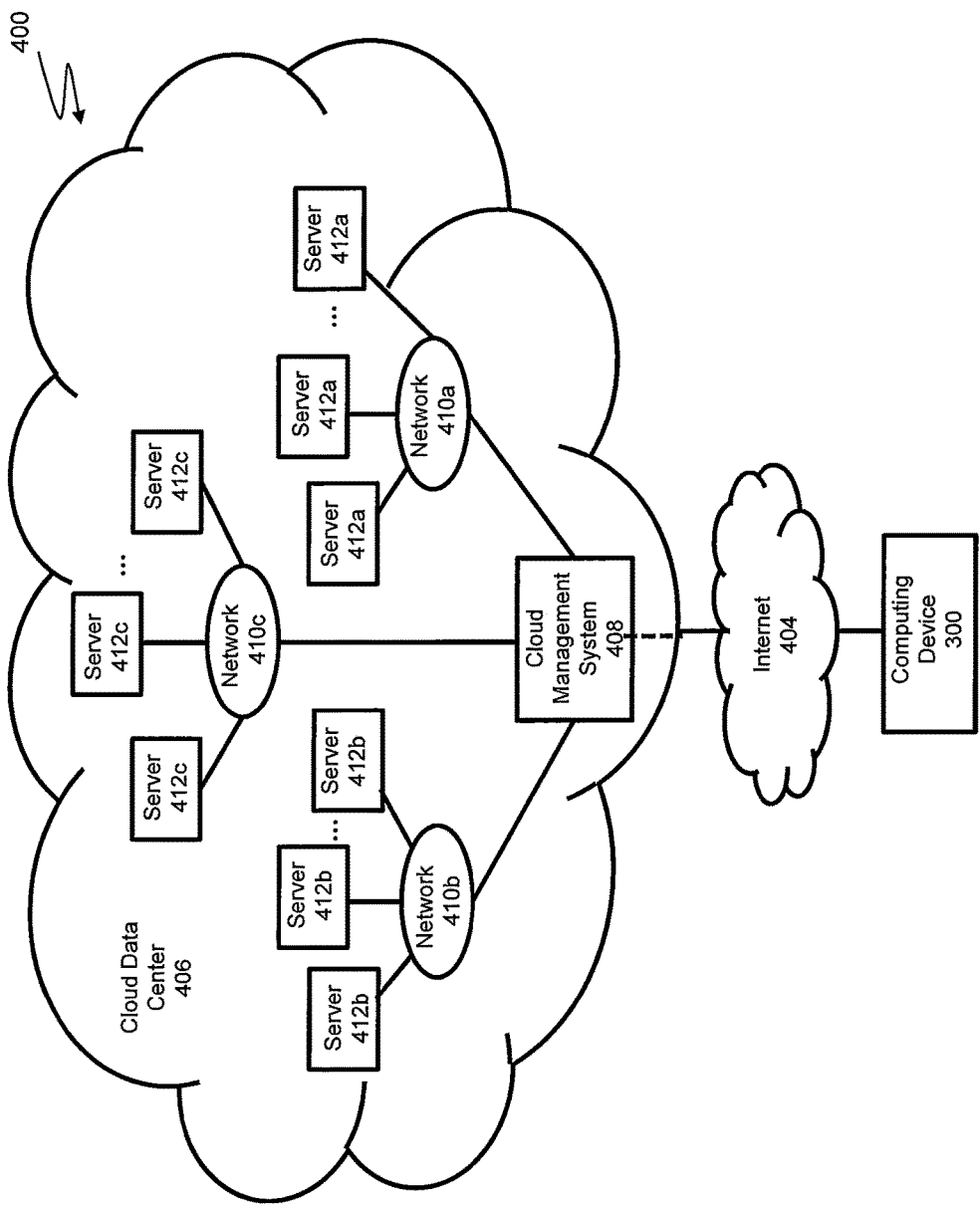
FIG. 12 illustrates an exemplary cloud computing network architecture that may be used to implement the methods according to one embodiment of the invention.

FIG. 12 illustrates an exemplary cloud computing system 400 network architecture that may be used to implement the invention. The cloud computing system 400 includes a plurality of interconnected computing environments. The cloud computing system 400 utilizes the resources from various networks as a collective virtual computer, where the services and applications may run independently from a particular computer or server configuration making hardware less important.

Specifically, the cloud computing system 400 includes at least computing device 300, such as that as described in reference to FIG. 11, through the use of which a distributed computing environment may be accessed to perform the methods disclosed herein.

The communication interface 316 of the computing device 300 allows communication through transferred signals between the computing device 300 and external devices including networks such as the Internet 404 and cloud data center 406. The computing device 300 establishes communication with the Internet 404—specifically to one or more servers—to, in turn, establish communication with one or more cloud data centers 406. A cloud data center 406 includes one or more networks 410a, 410b, 410c managed through a cloud management system 408. Each network 410a, 410b, 410c includes resource servers 412a, 412b, 412c, respectively. Servers 412a, 412b, 412c permit access to a collection of computing resources and components that may be invoked to instantiate a virtual machine, process, or other resource for a limited or defined duration. For example, one group of resource servers may host and serve an operating system or components thereof to deliver and instantiate a virtual machine. Another group of resource servers may accept requests to host computing cycles or processor time, to supply a defined level of processing power for a virtual machine. A further group of resource servers may host and serve applications to load on an instantiation of a virtual machine, such as the social network application, or other applications or software.

The cloud management system 408 may comprise a dedicated or centralized server and/or other software, hardware, and network tools to communicate with one or more networks 410a, 410b, 410c, such as the Internet or other public or private network, with all sets of resource servers 412a, 412b, 412c. The cloud management system 408 may be configured to query and identify the computing resources and components managed by the set of resource servers 412a, 412b, 412c needed and available for use in the cloud data center 406. Specifically, the cloud management system 408 may be configured to identify the hardware resources and components such as type and amount of processing power, type and amount of memory, type and amount of storage, type and amount of network bandwidth and the like, of the set of resource servers 412a, 412b, 412c needed and available for use in the cloud data center 406. Likewise, the cloud management system 408 may be configured to identify the software resources and components, such as type of Operating System ("OS"), application programs, and the like, of the set of resource servers 412a, 412b, 412c needed and available for use in the cloud data center 406.

The cloud computing system 400 of FIG. 12 is provided only for purposes of illustration and does not limit the invention to this specific embodiment. It is appreciated that a person skilled in the relevant art knows how to implement the invention using any network architecture.

While the invention has been described with reference to particular embodiments, those skilled in the art will recognize that many changes may be made thereto without departing from the scope of the invention. Each of these embodiments and variants thereof is contemplated as falling with the scope of the claimed invention, as set forth in the following claims.

The invention claimed is:

1. A computer implemented method for performing data-driven coordination of a transaction, comprising the steps of:
   providing at least two queries as an entangled query in extended Structured Query Language (SQL) in the form $\{C\}H:-B$, wherein B represents a body of the entangled query specifying conditions on data source relations from a WHERE clause, H represents a head of the entangled query corresponding to a SELECT INTO clause, and C represents a postcondition of the entangled query specifying conditions on answer relations from the WHERE clause;
   identifying one or more disconnected and independent query sets from the entangled query, wherein each query set excludes any query whose postcondition C unifies with the head H of two or more other queries;

determining a coordination structure based on automatically matching the head and the postcondition of each query in each of the one or more query sets to obtain one or more answerable query sets;
constructing one or more sets of combined queries based on the one or more answerable query sets;
forwarding the one or more sets of combined queries to one or more data sources to obtain one or more candidate answers of the combined queries;
evaluating one or more candidate answers of the combined queries to obtain one or more result answers; and
returning the one or more result answers, wherein the one or more result answers satisfy the head and postcondition of each query of the at least two queries.

2. The computer implemented method of claim 1, wherein said identifying and determining step further comprises the steps of:
constructing a unifiability graph based on the at least two queries;
partitioning the unifiability graph into one or more subsets, the subsets comprising connected components of the unifiability graph, wherein the unifiability graph is a multi-graph that contains a distinct node N(qi) for each query qi in the at least two queries;
processing the one or more subsets independently and in parallel; and
discovering coordination structure between the at least two queries by matching the head and postcondition of the query corresponding to each node in each of the one or more subsets to obtain the one or more answerable query sets.

3. The computer implemented method of claim 1, wherein the one or more datasources are one or more database, computer file, and data stream.

4. The computer implemented method of claim 1, wherein the head and postcondition are direct data as defined by a user.

5. The computer implemented method of claim 1, wherein the head and postcondition are context data as defined by completion of the transaction.

6. The computer implemented method of claim 1, wherein said evaluating step further comprises the step of presenting a unifiability graph that represents certain dependencies among the at least two queries.

7. The computer implemented method of claim 6, wherein the unifiability graph contains a distinct node for each combined query within the set of combined queries.

8. A computer implemented method for coordinating data, comprising the steps of:
generating entangled queries by receiving user inputs through a user interface, wherein each of the entangled queries is an extended Structured Query Language (SQL) in the form {C}H:–B, wherein B represents a body of the entangled query specifying conditions on data source relations from a WHERE clause, H represents a head of the entangled query corresponding to a SELECT INTO clause, and C represents a postcondition of the entangled query specifying conditions on answer relations from the WHERE clause;
executing an algorithm to evaluate the entangled queries, wherein the algorithm performs the following steps:
implementing query generation and callbacks on the computer application layer;
providing a query management process including the step of enforcing a staleness policy on a computer middleware layer;
performing coordination though a coordination module, wherein the coordination module includes a data source;
identifying one or more disconnected and independent query sets from the entangled queries, wherein each query set excludes queries whose postcondition C unifies with the head H of two or more other queries;
determining a coordination structure based on automatically matching the heads H and the postconditions C of each query in each of the one or more query sets to obtain one or more answerable query sets;
constructing one or more sets of combined queries based on the one or more answerable query sets;
sending the combined query to the data source for evaluation;
computing answers to the combined query by the coordination module; and
returning one or more answers to each of the entangled queries.

9. The computer implemented method of claim 8, wherein said providing step further comprises the step of removing a query from a list of pending queries when the query is determined stale by the staleness policy.

10. The computer implemented method of claim 8, wherein said performing step further comprises the steps of:
receiving a stream of queries; and
constructing a unifiability graph using suitable indices over the entangled queries.

11. The computer implemented method of claim 8, wherein the coordination module further comprises a server.

12. The computer implemented method of claim 8, wherein the algorithm may be executed periodically in a set-at-a time fashion.

13. The computer implemented method of claim 12, wherein the set-at-a-time fashion is specific time intervals.

14. The computer implemented method of claim 8, wherein the algorithm may be executed incrementally.

15. A system for automatically performing data-driven coordination, comprising:
a plurality of client computers, each client computer comprising a user interface operable to receive a query;
a computer network connecting the plurality of client computers, wherein each query of each client computer is received by the computer network resulting in a set of queries;
a data source connected to the computer network;
a memory connected to the computer network, wherein the memory includes an algorithm for evaluating the set of queries, and a processor coupled to the memory that executes the algorithm to perform the steps of:
receiving the set of queries in extended Structured Query Language (SQL) in the form {C}H:–B, wherein B represents a body of the set of queries specifying conditions on data source relations from a WHERE clause, H represents a head of the set of queries corresponding to a SELECT INTO clause, and C represents a postcondition of the set of queries specifying conditions on answer relations from the WHERE clause;
implementing query generation and callbacks on a computer application layer of the computer network;
providing a query management process and enforcing a staleness policy on a computer middleware layer of the computer network;
constructing a unifiability graph using suitable indices over the set of queries;

identifying one or more disconnected and independent query sets from the set of queries, wherein each query set excludes queries whose postcondition C unifies with the head H of two or more other queries;

determining a coordination structure based on automatically matching the heads and postconditions of each query in each of the one or more query sets to obtain one or more answerable query sets;

constructing a combined query based on the one or more answerable query sets;

sending the combined query to the data source;

computing one or more answers based on the combined query; and returning one or more answers to at least one client computer of the plurality of client computers, wherein the one or more answers satisfy the head and the postcondition of each query of the set of queries.

* * * * *